(12) United States Patent
Holdaway et al.

(10) Patent No.: US 7,987,353 B2
(45) Date of Patent: Jul. 26, 2011

(54) REMOTE BIOS FOR SERVERS AND BLADES

(75) Inventors: Kevan D. Holdaway, Hillsborough, NC (US); Ivan Ronald Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 11/971,700

(22) Filed: Jan. 9, 2008

(65) Prior Publication Data

US 2009/0177877 A1 Jul. 9, 2009

(51) Int. Cl.
G06F 9/00 (2006.01)
G06F 9/24 (2006.01)
G06F 1/24 (2006.01)

(52) U.S. Cl. .................. 713/2; 713/1; 713/100

(58) Field of Classification Search .............. 713/2
See application file for complete search history.

(56) References Cited

U.S. PATENT DOCUMENTS

| 6,904,482 | B2* | 6/2005 | Rietze et al. | 710/107 |
| 7,013,385 | B2* | 3/2006 | Abbondanzio et al. | 713/2 |
| 7,139,809 | B2 | 11/2006 | Husain et al. | |
| 7,240,188 | B2 | 7/2007 | Takata et al. | |
| 7,440,998 | B2* | 10/2008 | Hiray et al. | 709/203 |
| 2005/0177710 | A1 | 8/2005 | Rothman et al. | |
| 2006/0031448 | A1* | 2/2006 | Chu et al. | 709/223 |
| 2008/0162956 | A1* | 7/2008 | Bozek et al. | 713/310 |
| 2009/0133010 | A1* | 5/2009 | Bandholz et al. | 717/168 |

OTHER PUBLICATIONS

Stevens, A., "Options for bringing servers to heel (keyboard, video and mouse switches)," IT Week, vol. 9, No. 11, 31-34, Mar. 2006, 1 page.
Chen, A., "Slim server sips power (Rackable Systems C10000-L01 server review)," IT Week, vol. 9, No. 13, 17, Apr. 3, 2006, 1 page.
Wang, Andy et al., "The Conquest File System: Better Performance Through a Disk/Persistent-RAM Hybrid Design," ACM Transactions on Storage, vol. 2, No. 3, Aug. 2006, pp. 309-348.
Paradis, J. et al., "Porting Linux to the DEC Alpha: The Kernel and Shell," Kernel Korner, 2006, 7 pages.

* cited by examiner

Primary Examiner — Suresh K Suryawanshi
(74) Attorney, Agent, or Firm — Griffiths & Seaton PLLC

(57) ABSTRACT

A method for implementing a remote basic input/output system (BIOS) on a multi-blade server is provided. A remote BIOS partition is created on a management module of the multi-blade server for each blade of the multi-blade server residing on the management module. BIOS settings for operation on a first blade of the multi-blade server are defined.

20 Claims, 2 Drawing Sheets

REMOTE BIOS FOR SERVERS AND BLADES

BACKGROUND OF THE INVENTION

1. Field of the Invention

The present invention relates in general to computers, and more particularly to a method, system, and computer program product for implementing a remote basic input/output system (BIOS) on a multi-blade server.

2. Description of the Prior Art

Multiple blade servers are computers that consolidate high-density server boards (blades) in a single blade chassis (blade center chassis). Typically, a blade chassis accommodates multiple hot-swappable blades. The operations of the blades may be coordinated by management modules. Management modules may include a processor for controlling input/output functions, interfacing with a network (such as the Internet or a Local Area Network), and allocating jobs and data to the differing blades.

Currently, all blade servers that are part of a blade chassis or a stand-alone server require a user to physically come into contact with the unit if the user needs to perform functions associated with basic input/output system (BIOS), extensible firmware interface (EFI) or flexible service processor (FSP) menus. The user must bring additional hardware, such as a keyboard, monitor, and the like to the unit to access these menus and perform the functions. The inability for a user to remotely configure these menus becomes more problematic in a setting with multiple blade center chassis including a number of server blades. Furthermore, there is currently no centralized method to configure and manage the functions of a particular blade's BIOS/EFI/FSP within the management module.

SUMMARY OF THE INVENTION

A need exists for a system and method for configuring components of a blade chassis, such as a management module, to allow for remote configuration and management of each blade in the chassis. Accordingly, in one embodiment, by way of example only, a method for implementing a remote basic input/output system (BIOS) on a multi-blade server is provided. A remote BIOS partition is created on a management module of the multi-blade server for each blade of the multi-blade server associated with the management module. BIOS settings are defined for operation on a first blade of the multi-blade server. The BIOS settings reside on a first remote BIOS partition.

In another embodiment, again by way of example only, a system for implementing a remote basic input/output system (BIOS) on a multi-blade server is provided. A management module operational on the multi-blade server is configured to create a remote BIOS partition for each blade of the multi-blade server associated with the management module, and define BIOS settings for operation on a first blade of the multi-blade server. The BIOS settings reside on a first remote BIOS partition.

In still another embodiment, again by way of example only, a computer program product is provided for implementing a remote basic input/output system (BIOS) on a multi-blade server, the computer program product comprising a computer-readable storage medium having computer-readable program code portions stored therein. The computer-readable program code portions comprise a first executable portion configured to create a remote BIOS partition on a management module of the multi-blade server for each blade of the multi-blade server associated with the management module, and a second executable portion configured to define BIOS settings for operation on a first blade of the multi-blade server. The BIOS settings reside on a first remote BIOS partition.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for implementing a remote basic input/output system (BIOS) on a multi-blade server. These embodiments configure components of the multi-blade server, such as a management module to centrally configure and manage BIOS settings for each blade server in the chassis. Furthermore, the components may be remotely accessible and configurable by use of software such as a web application over a network. Such embodiments provide for remote, centralized management and control of each blade in the chassis through an interface.

Figure 1:
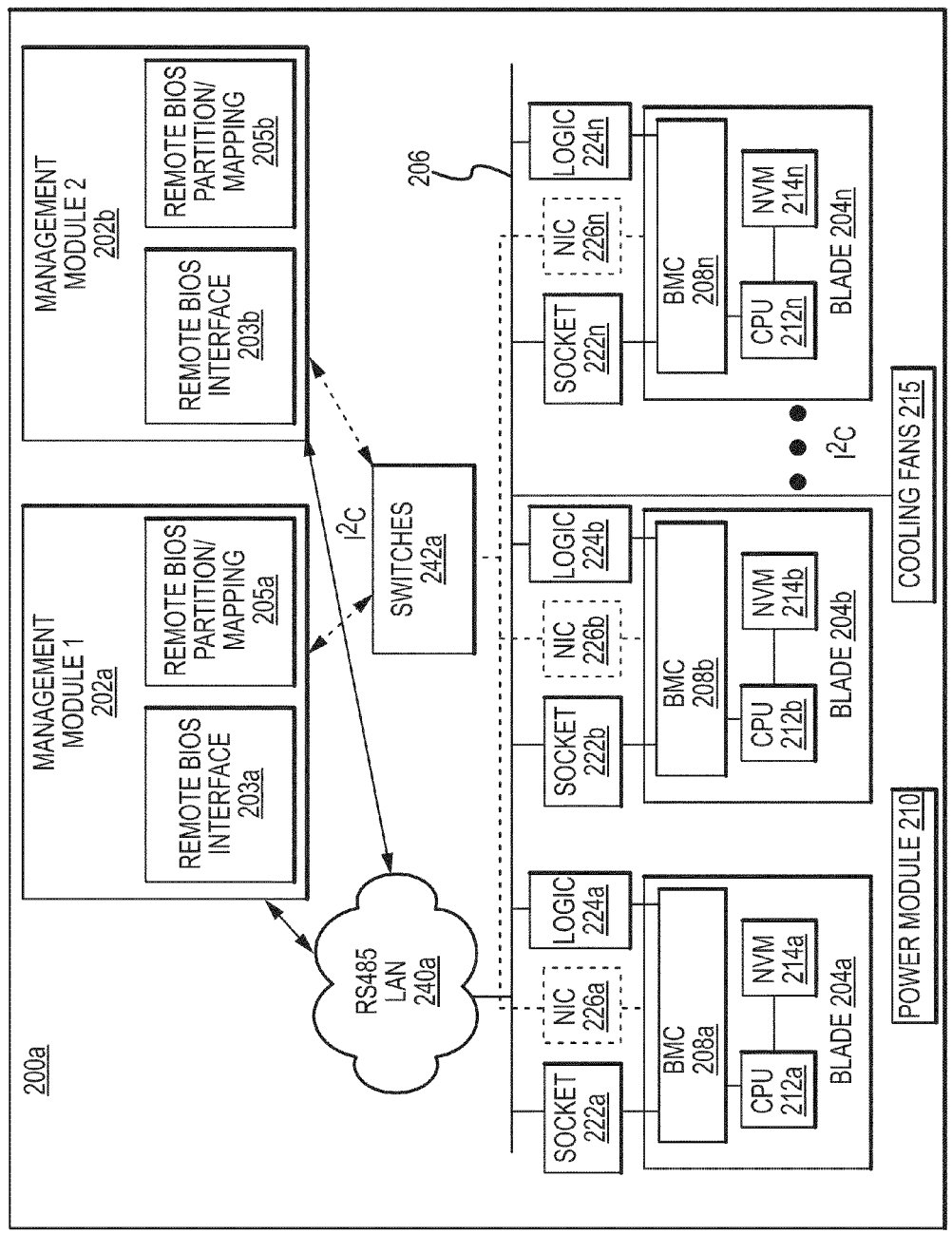
FIG. 1 is an exemplary server blade chassis incorporating a management module in which aspects of the claimed subject matter may be implemented.

FIG. 1 is an exemplary block diagram of a server blade chassis 200a. For the sake of clarity, only three server blades 204a,b,n are depicted. However, in one embodiment, server blade chassis 200a has a midplane 206 capable of connecting fourteen or more server blades 204.

Server blade chassis 200a has one or more management modules 202. In the depicted embodiment, server blade chassis 200a has a primary management module 202a and a back-up management module 202b. Each management module 202 is capable of managing multiple server blades 204. During normal operations, one of the local management modules 202a or 202b are coupled to server blades 204a-n via a Local Area Network (LAN) 240a, a midplane 206, and a plurality of Baseboard Management Controllers (BMCs) 208 (each server blade 204 having a BMC 208) to form an in-band management pathway. LAN 240 and BMC 208 are discussed in further detail below.

Management modules 202a and 202b include remote BIOS interface modules 203a and 203b, and remote BIOS partition/mapping modules 205a and 205b. The functionality of such modules with respect to the present description and claimed subject matter will be also discussed below in further detail.

Midplane 206 is a backplane, mounted in the middle of server blade chassis 200a, that contains circuitry and sockets 222 into which additional electronic devices or cards, including server blades 204 may be inserted. Midplane 206 contains at least one bus for secure in-band internal communication between management module 202 and server blades 204a-n, as well as between and among server blades 204a-n themselves, via respective BMCs 208a-n.

When a server blade 204 is inserted into a specific socket 222, a physical address is established for that server blade 204. For example, consider server blade 204a being inserted into socket 222a. A control logic 224a detects the presence of server blade 204a in socket 222a. Logic 224a may comport with the Electronics Industry Association (EIA) RS485 Standard for data communication. In other embodiments, Logic 224a may be compliant with the Phillips' Inter-IC (Inter-Integrated Circuit) standard (incorporated by reference in its entirety herein and commonly referred to as "$I^2C$"), or with an Ethernet network standard. Logic 224a, operating in conjunction with management module 202, assigns a physical address on a bus in midplane 206 to server blade 204a when server blade 204a is inserted into socket 222a. Each server blade 204 may be associated with a unique logic 224 that is connected to midplane 206 as depicted in FIG. 1. Alternatively, all server blades 204 may use a single logic 224.

Each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server may be used to assign an IP address to server blade 204a. Communication with server blade 204a is thereafter via a Network Interface Card (NIC) 226a that is associated with server blade 204a. The communication pathway using switches 242a and NICs 226 may be referred to as an out-of-band (OOB) network.

Each server blade 204 may have at least one central processing unit (CPU) 212, and a non-volatile memory (NVM) 214. NVM 214 is a Flash Read Only Memory ("Flash ROM" or "Flash Memory") that can be erased and reprogrammed in units of memory referred to as "blocks." NVM 214 may also include non-volatile Electrically Erasable Programmable Read Only Memory (EEPROM) that is similar to Flash Memory, except that EEPROM is erased and rewritten at the byte level and is usually smaller in capacity.

When a server blade 204 is shipped from a manufacturer, the NVM 214 may be pre-burned with firmware, including a BIOS as well as software for monitoring the server blade 204. Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

As previously described, various related functionality in addition to traditional BIOS functionality may be associated with each blade 204a-c. This includes the aforementioned EFI and FSP functionality. EFI is an emerging technology that provides a buffer between the operating system (OS) and the BIOS. For example, in a boot operation, the BIOS turns directly to EFI for pre-OS functions to be executed. EFI provides functionality a level of abstraction apart from the computer hardware. EFI may run an embedded Real Time Operating System (RTOS) that provides programmers with additional power and control over pre-OS functions. A FSP may contain system firmware and system code. As a result, FSP functionality relates to system functionality. For purposes of the instant description and claimed subject matter, reference to the term "BIOS" incorporates EFI and FSP functionality, as such functionality may be also centrally controlled and configurable using methodologies described herein.

Management modules 202 are capable of detecting the presence, quantity, type and revision level of each server blade 204, power module 210, and midplane 206 in the system. Management modules 202 may also directly control the operation of each server blade 204 and the power module 210, and may directly (without using the BIOS in the server blades 204) or indirectly (using the BIOS) control the operation of cooling fans 215 and other chassis 200a components.

Each server blade 204 has a Baseboard Management Controller (BMC) 208 that provides local supervisory control of the server blade 204 to which the BMC 208 is associated. Each BMC 208 is able to communicate with a local management module 202 by either using communication path 240a (in-band network) or alternatively by using switches 242a and NICs 226 (out-of-band network). The local management modules 202a, 202b may utilize a variety of communications paths 240a, such as an RS485 path 240a, a LAN path 240a and an $I^2C$ path 240a to communicate with each blade 204.

LAN 240 is an in-band network also comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222. That is, the primary communication pathway between management module 202 and server blades 204 is the in-band network that comprises LAN 240, sockets 222, and BMC 208. The secondary communication pathway, which is used in the present invention if all of the local management modules 202 should fail, is the OOB network that comprises switches 242 and NICs 226.

To implement a remote BIOS for each blade of a multi-blade server as depicted in FIG. 1, a series of BIOS settings may be defined for each blade 204a-n. The settings may be configured to reside on a central management device and interface of the chassis such as a management module 202a, 202b. Each blade's individual BIOS may be modified to always query the management module for blade-specific BIOS settings. The management module may then respond to the query with the blade-specific BIOS settings. The blade-specific BIOS settings could be initially set to default settings if a particular blade has never been inserted into the chassis 200a. Alternatively, if the particular blade matches a set profile, the management modules may provide a saved set of profile-specific BIOS settings. The management modules may be configured to communicate to each blade server both internally and externally (e.g., over an external network) via a particular chassis. In addition, the management modules may be adapted to be remotely configurable to simplify and minimize the interaction that the user has to have with respect to a particular blade server.

A remote BIOS partition 205a, 205b may be created within the management modules 202a, 202b for each blade (e.g., blades 204a-n) associated with the management modules. Remote BIOS settings that are blade-specific may then reside in each remote BIOS partition. A central logical partition interface such as remote BIOS interface 203a, 203b may be implemented within the management modules 202a, 202b adapted to control the BIOS (including EFI and FSP functionality) for each blade 204a-n. In addition, the interface 203a, 203b may be adapted to allow a user to remotely configure and modify settings such as the BIOS settings of a particular blade without the user having to enter a menu residing on the particular blade. Each blade 204a-n may be configured to cache the BIOS settings for cases when the management modules 202a, 202b are not accessible.

LAN 240a may be configured to allow communications between server blades 204a-n and the management modules 202a, 202b relating to the remote BIOS settings and BIOS management. The blades 204a-n may leverage BMCs 208a-n as proxies to communicate with the management modules 202a, 202b through the RS485 protocol. Similarly, the management modules may leverage BMCs 208a-n as proxies to communicate with the blades 204a-n through the RS485 protocol. In an alternative embodiment, an RS485 connection may be separately made between each blade 204a-n and the management modules 202a, 202b. Additionally, other communications protocols and paths may be utilized, such as the aforementioned I²C channel or the aforementioned TCP/IP and/or Ethernet channel over switches 242a.

The management modules 202a, 202b through the use of interfaces 203a, 203b may be configured to retain a mapping of blades to BIOS settings (as shown by partition/mapping module 205a, 205b). Each newly inserted blade may be allocated a particular logical partition of the partition/mapping modules 205a, 205b for its particular BIOS settings. The BIOS settings may be stored in a standardized format. The management modules 202a, 202b may be configured to provide a new blade with a default set of BIOS settings/preferences.

Figure 2:
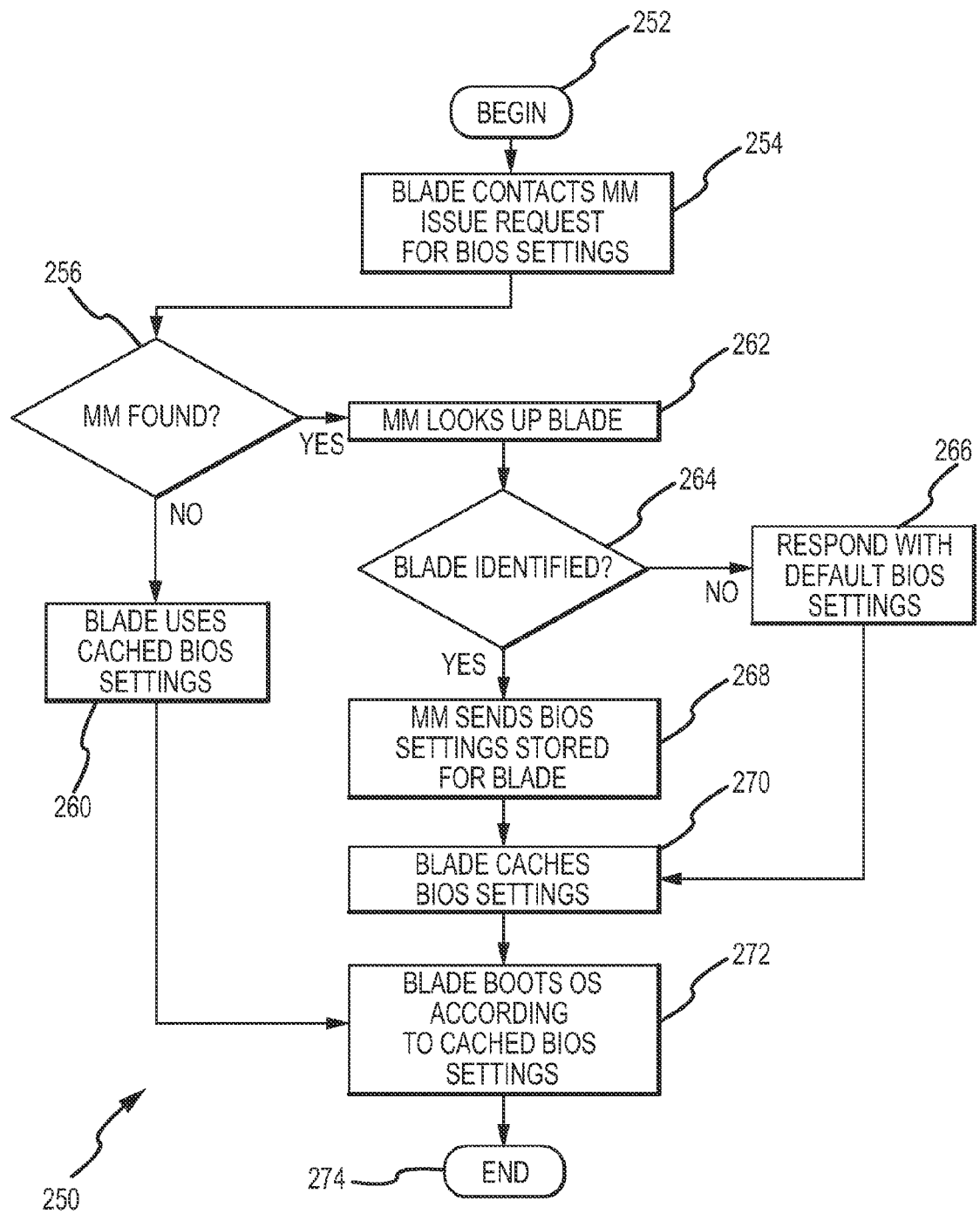
FIG. 2 is a flow chart diagram of an exemplary method for implementing a remote BIOS for a multi-blade server.

Turning to FIG. 2, a flow chart diagram of an exemplary method 250 for implementing a remote BIOS on a multi-blade server is depicted. As one skilled in the art will appreciate, various steps in the method may be implemented in differing ways to suit a particular application. In addition, the described method may be implemented by various means, such as hardware, software, firmware, or a combination thereof operational on or otherwise associated with the blade server environment. For example, the method 10 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

In one embodiment, a portion of method 250 may be performed when a blade or series of blades are first powered on. Method 250 begins (step 252) when the BIOS on a particular blade is loaded or inserted (e.g., pursuant to a power-on procedure). The BIOS/blade then immediately contacts the management module over the RS485 and issues a request for BIOS settings for that blade (step 254). If no management module is found (step 256) (the management module is not accessible or available for some reason), the blade uses its cached BIOS settings. These cached BIOS settings may be the last BIOS settings received from the management module, factory default settings, or other settings particular to that blade.

If the management module is found (the management module receives the request), the management module looks up the blade's remote BIOS partition using partition/mapping module 205a, 205b (FIG. 1) (step 262). In one embodiment, the management module may use a unique machine signature to identify the blade's partition.

If the management module is unable to identify the blade (step 264), then the management module responds to the request with default BIOS settings. Again, these settings may be tailored to a particular type of blade (e.g., a group of settings). If the blade is identified, then the management module sends the BIOS settings stored for the blade (step 268). The blade then caches the received BIOS settings (step 270), whether the settings are default or otherwise. Finally, the blade boots its operating system according to its cached BIOS settings (step 272). Method 250 then ends (step 274).

The remote BIOS interfaces 203a, 203b (FIG. 1) may be adapted to allow access from a software application, such as a web application to configure the BIOS settings and collectively manage the BIOS of each blade. For example, the interfaces 203a, 203b may be configured to present a webpage to a user with a configuration screen. The screen may include a set of defined BIOS settings that may be changed in the interface. Each blade may be assigned a differing configuration screen for remote BIOS settings to allow for customized configuration. The configurable BIOS settings may include one or more of the following: (1) boot location (e.g., CD, hard disk drive, network boot), (2) power-on password, (3) security, (4) power management, and (5) hardware diagnostics settings. Of course, various other settings may be implemented in a particular application.

In one embodiment, the user may log into a configuration screen for one or more blades in a particular chassis. The user may change a configuration of BIOS settings. The user may select to either apply the setting immediately, schedule an update to apply the settings at a later time, or wait for a manual power down to apply the settings.

When the management modules 202a, 202b (FIG. 1) are ready to apply the updated BIOS settings, a power down request may be then sent to one or more blades. The management modules then may wait for the blade to reset and then request its BIOS information. Such a request for BIOS information may be received pursuant to method 250 (FIG. 2). Once the request is received, the management module again searches its mapping (via partition/mapping module 205a, 205b, FIG. 1) and responds with the appropriate blade-specific data.

In general, software and/or hardware to implement various embodiments of the present invention, or other functions previously described, such as previously described method 250 (FIG. 2), can be created using tools currently known in the art.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implementing a remote basic input/output system (BIOS) on a multi-blade server, comprising:
    creating a remote BIOS partition on a management module of the multi-blade server for each blade of the multi-blade server associated with the management module;
    defining BIOS settings for operation on a first blade of the multi-blade server, the BIOS settings residing on a first remote BIOS partition; and
    using cached BIOS settings if the management module is unavailable.

2. The method of claim 1, further including configuring the first blade to cache the BIOS for use when the management module is not available.

3. The method of claim 1, further including configuring the BIOS to use a base management controller (BMC) as a proxy for communication from the BIOS to the management module.

4. The method of claim 1, further including configuring the management module to use a base management controller (BMC) as a proxy for communication from the management module to the BIOS.

5. The method of claim 1, further including assigning a default set of BIOS settings to a newly-inserted blade.

6. The method of claim 1, further including configuring the management module to:
    receive a request for the BIOS settings from the first blade over a communications protocol,
    identify the first remote BIOS partition incorporating the BIOS settings, and
    if the first blade is identified, respond to the request by sending the BIOS settings to the first blade.

7. The method of claim 6, further including configuring the management module to respond to the request with default BIOS settings if the first blade is not identified.

8. The method of claim 1, further including configuring the BIOS settings via a management module interface remotely accessible by a software application.

9. The method of claim 8, wherein configuring the BIOS settings further includes configuring a boot location, power-on password, security, power management or hardware diagnostics setting.

10. A system for implementing a remote basic input/output system (BIOS) on a multi-blade server, comprising:
    a management module operational on the multi-blade server; and
    a first blade in communication with the management module;
    wherein the management module is configured to create a remote BIOS partition for each blade of the multi-blade server associated with the management module, and define BIOS settings for operation on a first blade of the multi-blade server, the BIOS settings residing on a first remote BIOS partition, and
    further wherein the first blade is configured to use cached BIOS settings if the management module is unavailable.

11. The system of claim 10, wherein the first blade is configured to cache the BIOS for use when the management module is not available.

12. The system of claim 10, wherein the management module is further configured to:
    receive a request for the BIOS settings from the first blade over a communications protocol,
    identify the first remote BIOS partition incorporating the BIOS settings, and
    if the first blade is identified, respond to the request by sending the BIOS settings to the first blade.

13. The system of claim 12, wherein the management module is further configured to respond to the request with default BIOS settings if the first blade is not identified.

14. The system of claim 10, further including a management module interface remotely accessible by a software application for configuring the BIOS settings.

15. The system of claim 10, wherein the BIOS settings include a boot location, power-on password, security, power management or hardware diagnostics setting.

16. A computer program product for implementing a remote basic input/output system (BIOS) on a multi-blade server, the computer program product comprising a computer-readable storage medium having computer-readable program code portions stored therein, the computer-readable program code portions comprising:
    a first executable portion configured to create a remote BIOS partition on a management module of the multi-blade server for each blade of the multi-blade server associated with the management module;
    a second executable portion configured to define BIOS settings for operation on a first blade of the multi-blade server, the BIOS settings residing on a first remote BIOS partition; and
    a third executable portion configured for using cached BIOS settings if the management module is unavailable.

17. The computer program product of claim 16, further including a fourth executable portion for configuring the first blade to cache the BIOS for use when the management module is not available.

18. The computer program product of claim 16, further including:
    a fourth executable portion for configuring the management module to receive a request for the BIOS settings from the first blade over a communications protocol,
    a fifth executable portion for configuring the management module to identify the first remote BIOS partition incorporating the BIOS settings, and
    a sixth executable portion for configuring the management module to, if the first blade is identified, respond to the request by sending the BIOS settings to the first blade.

19. The computer program product of claim 18, further including a seventh executable portion for configuring the management module to respond to the request with default BIOS settings if the first blade is not identified.

20. The computer program product of claim 16, further including a fourth executable portion for remotely configuring the BIOS settings via a management module interface.

* * * * *